United States Patent
Uchida et al.

(10) Patent No.: US 8,433,905 B2
(45) Date of Patent: Apr. 30, 2013

(54) USER AUTHENTICATION DEVICE FOR AUTHENTICATION BETWEEN SERVER AND DEVICE BASED ON BANDWIDTH AND EFFECTIVE PERIOD

(75) Inventors: Kaoru Uchida, Tokyo (JP); Akira Monden, Tokyo (JP)

(73) Assignee: NEC Corporation, Tokyo (JP)

( * ) Notice: Subject to any disclaimer, the term of this patent is extended or adjusted under 35 U.S.C. 154(b) by 739 days.

(21) Appl. No.: 12/593,334

(22) PCT Filed: Mar. 3, 2008

(86) PCT No.: PCT/JP2008/053784
§ 371 (c)(1),
(2), (4) Date: Sep. 28, 2009

(87) PCT Pub. No.: WO2008/126507
PCT Pub. Date: Oct. 23, 2008

(65) Prior Publication Data
US 2010/0115593 A1     May 6, 2010

(30) Foreign Application Priority Data

Mar. 30, 2007    (JP) .................................. 2007-091170

(51) Int. Cl.
*G06F 5/06*    (2006.01)
*G06F 7/78*    (2006.01)
(52) U.S. Cl.
USPC ............................................. 713/168; 726/5
(58) Field of Classification Search ........................ None
See application file for complete search history.

(56) References Cited

U.S. PATENT DOCUMENTS

2006/0007897 A1    1/2006  Ishii

FOREIGN PATENT DOCUMENTS

| CN | 1682487 A | 10/2005 |
|---|---|---|
| JP | 2002-055956 A | 2/2002 |
| JP | 2004-343448 A | 12/2004 |

OTHER PUBLICATIONS

Robust Re-Authentication and Key Exchange Protocol for IEEE 802.11 Wireless LANS. Ganz et al. IEEE(1998).*
International Search Report for PCT/JP2008/053784 mailed Jun. 10, 2008.
Chinese Office Action for CN20088010248.9 mailed on Nov. 16, 2012.

* cited by examiner

*Primary Examiner* — Venkat Perungavoor

(57) ABSTRACT

This invention provides a user authentication control device, a user authentication device, a data processing device, and a user authentication control method and the like that control an authentication interval and an authentication effective period in accordance with a communication speed so as to make it possible to keep a balance between user convenience and safety. The user authentication device, which controls an authentication effective period for a user authentication device of a data processing device connected with a server device through a network, is provided with a bandwidth acquiring unit for acquiring a communication speed of the network and an effective period determining unit for determining an authentication effective period in accordance with the communication speed.

14 Claims, 3 Drawing Sheets

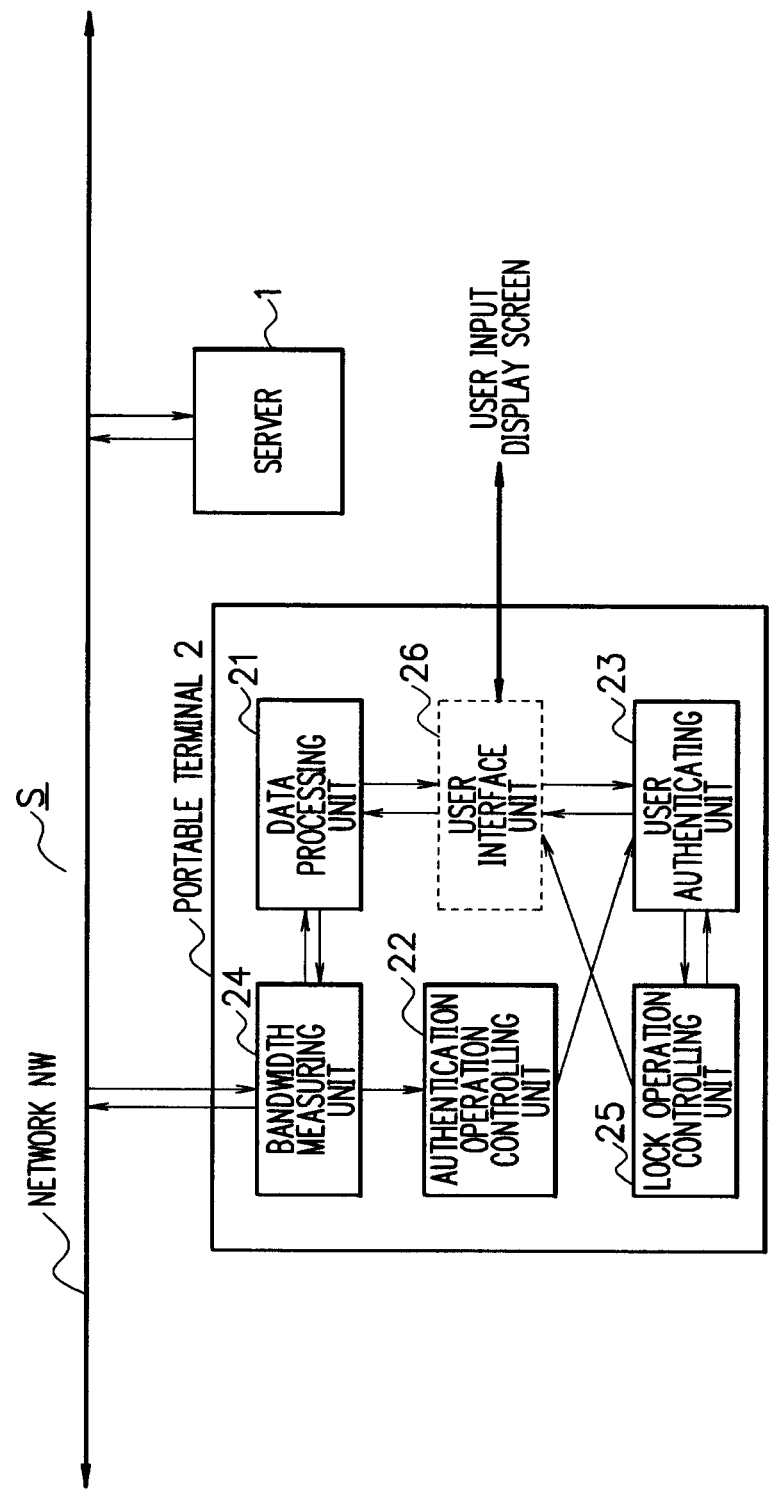

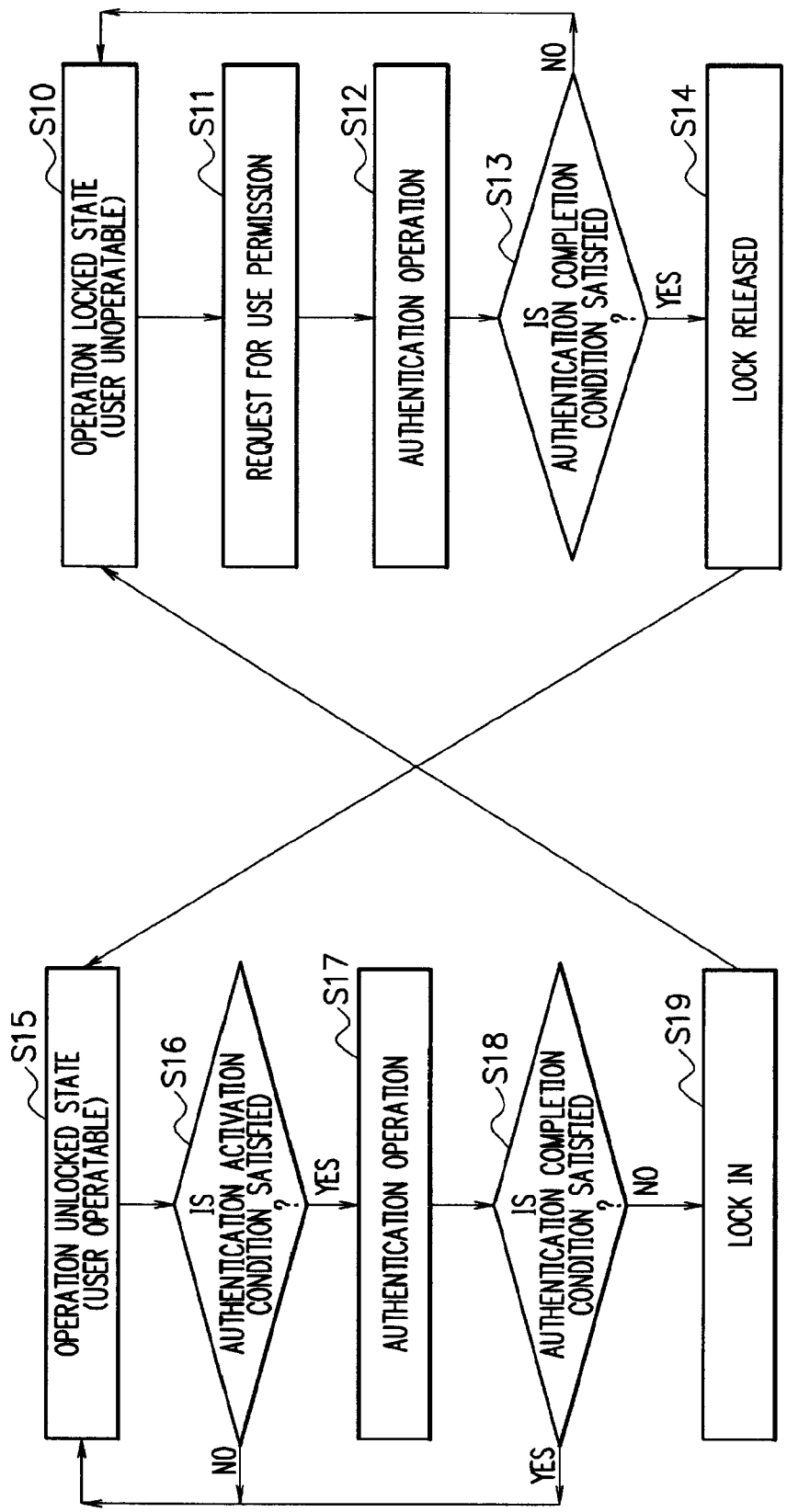

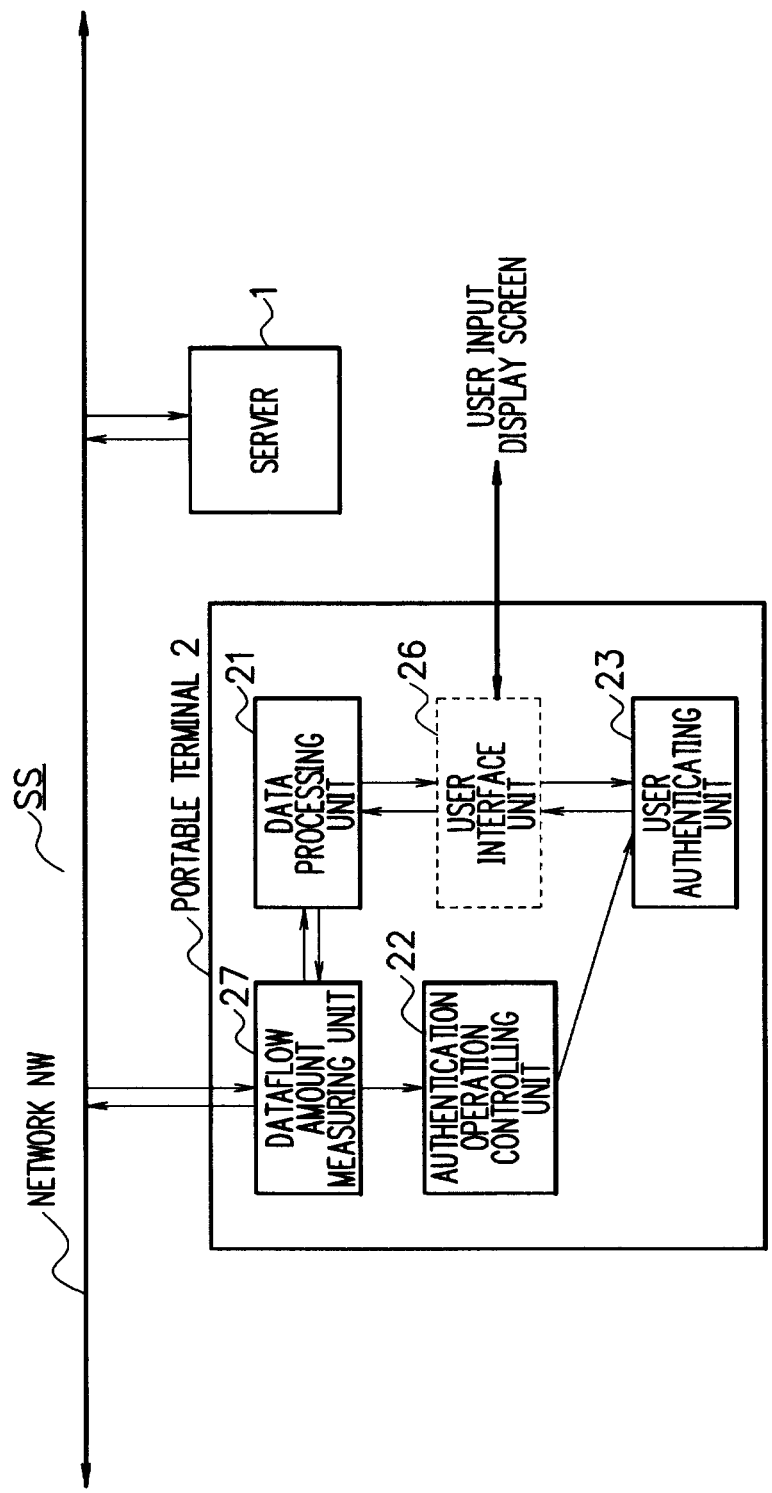

(12) United States Patent
US 8,433,905 B2

USER AUTHENTICATION DEVICE FOR AUTHENTICATION BETWEEN SERVER AND DEVICE BASED ON BANDWIDTH AND EFFECTIVE PERIOD

TECHNICAL FIELD

The present invention relates to a user authentication control device, a user authentication device, a data processing device, a user authentication control method and the like.

BACKGROUND ART

In a personal information device such as a cellular phone connected to a server via a network (hereinafter, referred to it as a mobile terminal), in order to prevent others from accessing to data stored in the device or the connected server, a system wherein the device is locked during a user is not using the device and user authentication is performed when the user starts to use the device has been employed.

However, if, for example, the user sets the mobile terminal to be locked at a timing that he or she closes it or does not perform a key operation over five minutes or more, and the user leaves the terminal opened on a desk carelessly, there arises a problem that other can make free use of the terminal continuously if the other steal the terminal four minutes after the user leaves it and starts illegally using it.

To dissolve this problem, it is effective to perform user authentication at a given timing for confirming whether an authorized user uses a mobile terminal even when someone is using the terminal continuously. Regarding this timing for performing the user authentication, a method for activating an operation of authentication at given intervals, for example at intervals of five minutes, has been proposed (for example, Patent Document 1).

Authentication processing requires, for example, inputting a password for password authentication or touching a fingerprint sensor for fingerprint authentication. This means that the user has to stop data processing having been performed just before the authentication. Accordingly, the usability for users decreases when the authentication is required many times.

On the other hand, in a case of a mobile terminal, a communication speed is fast in a place near to, for example, an access point or a base station, and is slow in a place far to the access point or the base station. Further, the communication speed is also slow in a crowded place such as a downtown since many users share the same communication band. In addition, the communication speed is slow in a time period when many users are participating in the communication because of congestion and, conversely, is fast in a time period when few peoples are communicating. Thus, the communication speed is changeable according to a place or a time period.

Patent Document 1: Japanese Patent Application Laid-Open No. 2002-55956

DISCLOSURE OF THE INVENTION

Problem to be Solved by the Invention

However, when the operation of user authentication is activated at the given intervals as described above, a large amount of data can be transferred at a fast communication speed, whereas only a small amount of data is transferred at a slow communication speed within the same interval.

When the interval for performing the authentication is adapted according to the case of fast communication speed for securing safety, the operation of authentication at a slow communication speed comes to be performed at the same intervals. This results being required for performing the authentication more than necessity, therefore, the usability decreases.

Also, in a case that communication is conducted, when the authentication is performed frequently even at a slow communication speed, the ratio of data amount for the authentication among the total amount of communication data becomes high. Accordingly, there arises a problem that the actual data transferring speed further becomes slow.

On the other hand, taking into account for the user's usability, if the interval for performing the authentication is adapted according to the case of slow communication speed, a large amount of data can be transferred within one interval at a fast communication speed, thus it causes fear for security.

The present invention is made in view of the above described circumstances, and an exemplary object of the present invention is to provide a user authentication control device, a user authentication device, a data processing device, a user authentication control method and the like, which keep a balance between user convenience and safety by controlling an authentication interval or an authentication effective period according to a communication speed.

Means for Solving the Problem

To attain the above-mentioned exemplary object, a first exemplary aspect of the present invention is a user authentication control device, which controls an authentication effective period for a user authentication device of a data processing device connected with a sever device through a network, the user authentication control device including: bandwidth acquiring means for acquiring a communication speed of the network; and effective period determining means for determining an authentication effective period based on the communication speed.

A second exemplary aspect of the present invention is a user authentication control device in accordance with the first exemplary aspect, wherein the user authentication control device performs a next user authentication before the effective period expires; acquires a communication speed of the network; and extends an authentication effective period for a time period determined based on the communication period.

A third exemplary aspect of the present invention is a user authentication control device in accordance with the first exemplary aspect, wherein, in a case that the data processing device is further used after the effective period expires, the user authentication control device performs a user authentication again and extends an authentication effective period for a time period determined based on the communication speed.

A fourth exemplary aspect of the present invention is a user authentication control device in accordance with one of the first to third exemplary aspects, wherein the bandwidth acquiring means acquires a communication speed measured by a second device.

A fifth exemplary aspect of the present invention is a user authentication control device in accordance with one of the first to fourth exemplary aspects, wherein the effective period is determined to be shorter as the communication speed becomes faster.

A sixth exemplary aspect of the present invention is a user authentication control device in accordance with the fifth exemplary aspect, wherein the effective period is determined in inverse proportion to the communication speed.

A seventh exemplary aspect of the present invention is a user authentication control device in accordance with one of the first to fourth exemplary aspects, further including, instead of the bandwidth acquiring means, dataflow amount acquiring means for measuring an amount of dataflow communicated between the server device via the network, wherein a time when a total amount of dataflow exceeds a predetermined amount is set to an end of the effective period.

An eighth exemplary aspect of the present invention is a user authentication device, including: the user authentication control device in accordance with one of the first to seventh exemplary aspects; and user authenticating means for performing a user authentication.

A ninth exemplary aspect of the present invention is data processing device, including: the user authentication device in accordance with the eighth exemplary aspect; and data processing means for processing data from the server device.

A tenth exemplary aspect of the present invention is a user authentication control program for causing a computer to function as the user authentication control device in accordance with one of the first to seventh exemplary aspects.

An 11th exemplary aspect of the present invention is a computer readable storage medium for storing the user authentication control program in accordance the tenth exemplary aspect.

A 12th exemplary aspect of the present invention is a user authentication control method for controlling an authentication effective period for a user authentication device of a data processing device connected with a sever device via a network, the user authentication control method including: a bandwidth acquiring step of acquiring a communication speed of the network; and an effective period determining step of determining an authentication effective period based on the communication speed.

Effects of the Invention

According to the present invention, a balance between user convenience and safety can be kept by controlling an authentication interval or the an authentication effective period according to a communication speed.

Specifically, according to the present invention, the problem of decreasing user convenience due to frequent requests for authentication at slow communication speed can be solved. Conversely, the problem such that when, considering user convenience, the authentication interval is set to be a longer period for adapting a case of slow communication speed, a large amount of data is transferred in one authentication at a high communication speed, thus it causes fear for security can be solved.

Moreover, since the degree of damage due to the leakage of confidential information is not simply determined in proportion to an amount of the leakage but finally becomes visible when the amount of leakage exceeds a threshold, there exists a possibility that a risk increases suddenly if a lot of amount of confidential information leaks out. Accordingly, it is required to control an amount of transferable data below a certain value in view of risk management. Therefore, making a total amount of transferable data in one authentication procedure below a certain value is effective.

BEST MODE FOR CARRYING OUT THE INVENTION

A description will be given hereinbelow to exemplary embodiments in the present invention with reference to the drawings. The exemplary embodiment described hereinbelow is an exemplary embodiment in a case where the present invention (a user authentication control device, a user authentication device, a data processing device or the like) is applied to a network terminal system S.

At first, a structure and a function of a network terminal system S according to a first exemplary embodiment will be described with reference to FIG. 1. FIG. 1 is an exemplary diagram showing a configuration of the network terminal system S according to the first exemplary embodiment.

As shown in FIG. 1, the network terminal system S comprises a server 1 as a server device and a mobile terminal 2 connected to the server 1 via a network NW. The mobile terminal 2 comprises a data processing unit 21 as an example of data processing means, an authentication operation controlling unit 22 as a example of authentication operation controlling means, a user authenticating unit 23 as an example of user authenticating means, a bandwidth measuring unit 24 as an example of bandwidth acquiring means, a lock operation controlling unit 25 and a user interface unit 26.

The data processing unit 21, the authentication operation controlling unit 22, the user authenticating unit 23, the bandwidth measuring unit 24 or the like can be realized by causing a CPU to reading out a prescribed program (including the user authentication controlling program according to the present invention) from a recording medium such as a Read Only Memory (ROM) or a hard disk and execute the program.

The mobile terminal 2 utilizes data stored in the server 1 by communicating with the server 1 via the network NW. Here, the network NW according to the exemplary embodiment is a wireless network, a wire network or a combination thereof.

The utilization of data of the server 1 includes transferring data stored in the server 1 to the mobile terminal 2; performing data processing on the server 1 while the mobile terminal 2 not having a function for data processing, and displaying only a result on the mobile terminal 2; and performing processing on the server 1 which performs processing as a virtual calculator, sending only a display screen to the mobile terminal 2 and utilizing only the screen of the mobile terminal 2. Incidentally, it is assuming that the data according to the exemplary embodiment is processed at the data processing unit 21 of the mobile terminal 2.

The user interface unit 26 includes at least an inputting unit which is not shown (a keypad) and a screen displaying unit which is not shown. The user interface unit 26 performs inputting/outputting data from/to a user terminal.

The utilization of the server 1 or the data stored in the server 1 is restricted. Therefore, a user can use the server 1 or the data stored in the server 1 within a scope where the user possesses a right for using by performing the user authentication.

The user authentication is performed by known user authenticating means such as password authentication by inputting a password through the user interface unit 26, or biometrics authentication using fingerprints or a face if additional inputting means such as a camera is provided.

The bandwidth measuring unit 24 observes and measures a communication speed (a bandwidth) between the data processing unit 21 performing data processing on the mobile terminal 2 and the network NW.

In addition, the bandwidth measuring unit 24 sometimes receives a result measured by another device besides measuring the bandwidth itself.

The authentication operation controlling unit 22 determines whether or not an authentication operation activation timing condition is satisfied based on the communication speed measured by the bandwidth measuring unit 24 as an input. If the timing condition is satisfied, an instruction for performing the user authentication is directed to the user authenticating unit 23, then the user authenticating unit 23 activates an operation of authentication. In the user authentication procedure in which the mobile terminal 2 such as a cellular phone connected to the server 1 via the network NW confirms intermittently whether an authorized user uses the mobile terminal 2 when the terminal is in a using state in order to prevent others from accessing to the data stored in the mobile terminal 2 or the server 1 connected to the terminal, the interval for activating the authentication operation or the authentication effective period is determined according to a communication speed or an amount of data (an amount of dataflow: the mobile terminal 2 may measure the amount of dataflow directly or may acquired the data measured by another device as the amount of dataflow) between the server 1 and the mobile terminal 2.

Typically, the interval of the timing for user authentication (the authentication interval) or the authentication effective period (the effective period) is determined in inverse proportion to the communication speed (as the communication speed or the amount of dataflow increases, the authentication interval or the effective period is controlled to be shorter); namely, the authentication is set to be executed frequently when a large amount of data flows, or the timing for user authentication is determined based on the fact that, as a criterion for determination, a total amount value of the data measured by the bandwidth measuring unit 24 exceeds a given value.

The user authenticating unit 23 hereby displays a massage such as "input an identification number" to the screen according to a predetermined authentication condition. Then the user performs an operation of, for example, inputting an identification number using the key inputting unit. When the user authenticating unit 23 confirms that a condition for success of authentication that, for example, the inputted identification number is consistent with the preset number is satisfied, an operation unlocked state is continued thereby the user can use the mobile terminal 2 continuously. Conversely, if the authentication condition is not satisfied, an instruction for activating a locking operation is directed to the lock operation controlling unit 25 thereby the mobile terminal 2 enters into an operation locked state.

In the operation locked state, the user interface unit 26 is controlled to invalidate the key inputting operation and the display screen displays a message that the mobile terminal is in the operation locked state, thereby it is impossible to operate the mobile terminal 2 or access to the stored data.

Next, an operation of the mobile terminal which starts from the operation locked or operation unlocked state while the user is using the terminal in the network terminal system S according to the first exemplary embodiment will be described with reference to FIG. 2.

When starting to use the data stored in the mobile terminal 2 or the server 1 through the mobile terminal 2 in the operation locked state (step S10), the user requests permission for use by, for example, pushing down a predetermined key of the mobile terminal 2 (step S11), thereby an operation of user authentication is activated.

Then, an instruction for the user authentication is directed to the user authenticating unit 23 and the user authenticating unit 23 activates the operation of user authentication (step S12).

The user authenticating unit 23 hereby displays a message such as "input an identification number" to the screen according to the predetermined authentication condition (step S13). Then the user performs an operation of, for example, inputting an identification number using the key inputting unit. When the user authenticating unit confirms that a condition for success of authentication that, for example, the inputted identification number is consistent with the preset number is satisfied, the authentication results in success (step S13; YES) and the operation locked state is released (step S14) thereby the mobile terminal turns to the operation unlocked state (step S15).

In the operation unlocked state, the user can use the data stored in the mobile terminal 2 or the server 1 through the mobile terminal 2. After the start of using the mobile terminal, the operation of user authentication is activated at a timing that a predetermined authentication activation condition is satisfied (step S16).

The user authentication after the start of using is performed to prevent others from accessing to the server 1 or the data stored in the server 1 continuously even when the authenticated mobile terminal 2 is lost or stolen. Moreover, since there may exists a possibility that an irrelevant person is authorized by mistake in the user authentication, the user authentication after the start of using is performed to prevent others from accessing to the server 1 or the data stored in the server 1 continuously with only one false user authentication.

The interval of the user authentication activation timing or the authentication effective period is controlled based on the communication speed. The authentication interval or the authentication effective period is determined in inverse proportion to the communication speed. When the determined period elapses from the previous user authentication, it is confirmed whether or not the authentication activating condition is satisfied.

To make the maximum transferable data amount in one authentication equal to or smaller than a predetermined value, the authentication interval or the authentication effective period is determined in inverse proportion to the communication speed. For example, if the communication speed is 10 Mbit/sec, the transferable data amount for 1000 seconds is 10 Gbit.

For transferring the same data amount of 10 Gbit, it is required 10000 seconds for the communication speed of 1 Mbit/sec, and it is required 100 seconds for the communication speed of 100 Mbit/sec. Thus the required time for transferring the same amount of data is determined in inverse proportion to the communication speed. Therefore, when the authentication interval is set to 10000 seconds for the communication speed of 1 Mbit/sec, 1000 seconds for 10 Mbit/sec, and 100 seconds for 100 Mbit/sec, the maximum data amount of 10 Gbit can be transferred in one authentication at every communication speed.

When the user authentication activation condition is satisfied (step S16; YES), the operation of authentication is activated in the user authenticating unit 23. Subsequently, an instruction for user authentication is directed to the user authenticating unit 23 and the operation of authentication is activated in the user authenticating unit 23 (step S17).

Accordingly, the user authenticating unit 23 displays a message such as "input an identification number" to the screen according to the predetermined authentication condition. Then the user performs an operation of, for example, inputting an identification number using the key inputting unit. When the user authenticating unit 23 confirms that a condition for success of authentication that, for example, the inputted identification number is consistent with the preset number is satisfied, the authentication results in success (step S18; YES) and the operation unlocked state is continued (step S15).

On the other hand, if the authentication fails (step S18; NO), the operation is locked in (step S19) and the mobile terminal enters in the operation locked state (step S10). In the operation locked state, the key inputting operation is invalidated and the display screen displays a message indicating that the mobile terminal is in the operation locked state, thus it is impossible to operate the mobile terminal 2 or access to the stored data.

Further, in a case that, even if it is not convinced of the abnormal event, there exists any distrust event such as that the authentication often fails or that the present using state of the server 1 differs from the usual using state for the user, the authentication interval may be set shorter to improve security.

As a user authentication method, face authentication may be preferably performed using a face at usage of the mobile terminal 2 for avoiding interrupting data processing of the user.

However, considering a possibility that the face authentication may fail at a certain frequency or that the face may not look to an appropriate direction at a timing of authentication, even in the face authentication, it is effective to set the authentication interval with keeping the balance between the user's usability and the security.

Next, a network terminal system SS according to a second exemplary embodiment will be described with reference to FIG. 3.

The network terminal system SS according to the second exemplary embodiment differs from the network terminal system S according to the first exemplary embodiment in a point of employing an amount of dataflow instead of the communication speed. Other features of, for example, changing a coefficient based on the significance of the server 1 or data and changing a coefficient if there exists other distrusts are variations of the network terminal system S according to the first exemplary embodiment. The variations are effective also in the network terminal system SS according to the second exemplary embodiment.

Concretely, in the network terminal system S according to the first exemplary embodiment, a coefficient is determined in inverse proportion to the communication bandwidth (communication speed), whereas this coefficient can also be determined according to the significance of the server 1 or the data. Specifically, when the server 1 or the data are important, the coefficient is set to small to make the upper limit of the transferable data amount in one authentication smaller for improving security; conversely, when the significance of the server 1 or the data is low, the coefficient is set to large to make the authentication interval longer, thereby improving user convenience.

Furthermore, the authentication interval may be adjusted based on the amount of the actual transferred data or the significance of the actual transferred data as well as the communication speed which is a value for determining the upper limit of the transferable data amount.

Referring to FIG. 3, the network terminal system SS according to the second exemplary embodiment includes, instead of the bandwidth measuring unit 24 of the network terminal system S in accordance with the first exemplary embodiment, a dataflow amount measuring unit 27 as means for acquiring an amount of dataflow.

The dataflow amount measuring unit 27 judges an authentication activating condition based on an amount of dataflow in one direction or both directions of dataflow (e.g., total bite number of flowed data).

As described above, the network terminal system S comprises the server 1 and the mobile terminal 2 connected to the server 1 via the network NW. The mobile terminal 2 comprises the data processing unit 21, the authentication operation controlling unit 22, the user authenticating unit 23, the bandwidth measuring unit 24 or the dataflow amount measuring unit 27, the lock operation controlling unit 25, and the user interface unit 26. With this configuration, it is possible to change the effective period for one authentication according to the communication speed, and further it is possible to set the total amount of data (the maximum value) usable at one authentication constant, thereby a balance between user convenience and safety can be kept.

Incidentally, the present invention is applicable to a general information device including a cellular phone or a personal computer which are used in connection with the server 1 via the network NW. Specifically, the present invention is effective when the device is used in continuously connection with the network like a thin client.

This application is the National Phase of PCT/JP2008/053784, filed on Mar. 3, 2008, which is based upon and claims the benefit of priority from Japanese patent application No. 2007-091170, filed on Mar. 30, 2007, the disclosure of which is incorporated herein in its entirety by reference.

BRIEF DESCRIPTION OF THE DRAWINGS

[FIG. 1] is a diagram showing an example of a configuration of a network terminal system S in accordance with a first exemplary embodiment.

[FIG. 2] is a example of a flowchart of the network terminal system S in accordance with the first exemplary embodiment.

[FIG. 3] is a diagram showing an example of a configuration of a network terminal system SS in accordance with a second exemplary embodiment.

EXPLANATION OF REFERENCE NUMERALS

1 Server
2 Portable terminal
21 Data processing unit
22 Authentication operation controlling unit
23 User authenticating unit
24 Bandwidth measuring unit
25 Lock operation controlling unit
26 User interface unit
27 Dataflow amount measuring unit
NW Network
S Network terminal system
SS Network terminal system

The invention claimed is:

1. A user authentication control device, which controls an authentication effective period for a user authentication device of a data processing device connected with a sever device through a network, the user authentication control device used for user authentication comprising:
   a control unit including a central processing unit (CPU);
   a bandwidth acquiring unit, executed by the control unit, that acquires a communication speed of the network; and
   an effective period determining unit that:
   determines an authentication effective period based on the communication speed and on the significance of one of the server device and the data stored in the server device; and
   changes a coefficient based on the significance of one of the server device and the data stored in the server device, wherein the coefficient is set to small to make the upper limit of a transferable data amount in one authentication, when one of the server device and the data stored in the server device is important, and the coefficient is set to large to make an authentication interval longer, when the significance of one of the server device and the data stored in the server device is low.

2. The user authentication control device in accordance with claim 1, wherein the user authentication control device performs a next user authentication before the effective period expires;
acquires a communication speed of the network; and
extends an authentication effective period for a time period determined based on the communication period.

3. The user authentication control device in accordance with claim 1, wherein,
in a case that the data processing device is further used after the effective period expires, the user authentication control device performs a user authentication again and extends an authentication effective period for a time period determined based on the communication speed.

4. The user authentication control device in accordance with claim 1, wherein
the bandwidth acquiring unit acquires a communication speed measured by a second device.

5. The user authentication control device in accordance with claim 1, wherein
the effective period is determined to be shorter as the communication speed becomes faster.

6. The user authentication control device in accordance with claim 5, wherein
the effective period is determined in inverse proportion to the communication speed.

7. A user authentication control device, which controls an authentication effective period for a user authentication device of a data processing device connected with a sever device through a network, the user authentication control device used for user authentication comprising:
a control unit including a central processing unit (CPU);
a dataflow amount acquiring unit, executed by the control unit, that measures an amount of dataflow communicated between the server device via the network, wherein
a time when a total amount of dataflow exceeds a predetermined amount is set to an end of the authentication effective period; and
an effective period determining unit that:
determines an authentication effective period based on the communication speed and on the significance of one of the server device and the data stored in the server device; and
changes a coefficient based on the significance of one of the server device and the data stored in the server device, wherein the coefficient is set to small to make the upper limit of a transferable data amount in one authentication, when one of the server device and the data stored in the server device is important, and the coefficient is set to large to make an authentication interval longer, when the significance of one of the server device and the data stored in the server device is low.

8. A user authentication device, comprising:
the user authentication control device in accordance claim 1;
and a user authenticating unit that performs a user authentication.

9. A data processing device, comprising:
the user authentication device in accordance with claim 8; and
a data processing unit that processes data from the server device.

10. A non-transitory computer readable storage medium for storing a user authentication control program, for causing a computer to function as the user authentication control device used for user authentication in accordance with claim 1.

11. A user authentication control method executed by a computer for controlling an authentication effective period for a user authentication device of a data processing device connected with a sever device via a network, the user authentication control method used for user authentication comprising:
a bandwidth acquiring step of acquiring a communication speed of the network;
an effective period determining step of determining an authentication effective period based on the communication speed and on the significance of one of the server device and the data stored in the server device; and
a step of changing a coefficient based on the significance of one of the server and the data stored in the server, wherein the coefficient is set small to make the upper limit of a transferable data amount in one authentication, when one of the server and the data stored in the server is important, and the coefficient is set large to make an authentication interval longer, when the significance of one of the server and the data stored in the server is low.

12. A user authentication device, comprising:
the user authentication control device in accordance with claim 1; and
a user authenticating unit for performing a user authentication.

13. A user authentication control method executed by a computer for controlling an authentication effective period for a user authentication device of a data processing device connected with a server device via a network, the user authentication control method used for user authentication comprising:
a dataflow amount acquiring step of measuring an amount of dataflow communicated between the server device via the network, wherein
a time when a total amount of dataflow exceeds a predetermined amount is set to an end of the authentication effective period;
an effective period determining step of determining an authentication effective period based on the communication speed and on the significance of one of the server device and the data stored in the server device; and
a step of changing a coefficient based on the significance of one of the server device and the data stored in the server device, wherein the coefficient is set to small to make the upper limit of a transferable data amount in one authentication, when one of the server device and the data stored in the server device is important, and the coefficient is set to large to make an authentication interval longer, when the significance of one of the server device and the data stored in the server device is low.

14. A user authentication device, comprising:
the user authentication control device in accordance with claim 7; and
a user authenticating unit for performing a user authentication.

* * * * *